US012084367B2

(12) United States Patent
Pu et al.

(10) Patent No.: US 12,084,367 B2
(45) Date of Patent: Sep. 10, 2024

(54) STAGGERED ELECTRODE BIO-ELECTRO-FENTON GROUNDWATER CIRCULATION WELL SYSTEM, AND ELECTRO-FENTON ASSEMBLY

(71) Applicant: CHENGDU UNIVERSITY OF TECHNOLOGY, Sichuan Province (CN)

(72) Inventors: Shengyan Pu, Sichuan Province (CN); Hui Ma, Sichuan Province (CN); Dong Yu, Sichuan Province (CN); Shibin Liu, Sichuan Province (CN); Peng Wang, Sichuan Province (CN); Bowen Li, Sichuan Province (CN); Xin Wang, Sichuan Province (CN); M Chen, Sichuan Province (CN); Tao Zhang, Sichuan Province (CN); Jinsong Chen, Sichuan Province (CN); Qiang Tang, Sichuan Province (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/028,575

(22) PCT Filed: Sep. 21, 2022

(86) PCT No.: PCT/CN2022/120157
§ 371 (c)(1),
(2) Date: Mar. 27, 2023

(87) PCT Pub. No.: WO2023/134211
PCT Pub. Date: Jul. 20, 2023

(65) Prior Publication Data
US 2024/0262724 A1     Aug. 8, 2024

(30) Foreign Application Priority Data

Jan. 11, 2022 (CN) .......................... 202210030249.1

(51) Int. Cl.
*C02F 3/00* (2023.01)
*C02F 3/28* (2023.01)
*C02F 103/06* (2006.01)

(52) U.S. Cl.
CPC ............ *C02F 3/005* (2013.01); *C02F 3/2806* (2013.01); *C02F 3/2866* (2013.01);
(Continued)

(58) Field of Classification Search
CPC ...... C02F 3/005; C02F 3/2806; C02F 3/2866; C02F 2103/06; C02F 2201/46115; C02F 2203/006
(Continued)

(56) References Cited

U.S. PATENT DOCUMENTS

| RE32,077 E | 2/1986 | deNora et al. |
| 2012/0276418 A1 | 11/2012 | Zhou et al. |
| 2019/0284073 A1* | 9/2019 | Yost .......................... C02F 9/00 |

FOREIGN PATENT DOCUMENTS

| AU | 2009304584 A1 | 4/2019 |
| CN | 102976472 A | 3/2013 |

(Continued)

OTHER PUBLICATIONS

First Office Action in corresponding CN Application No. 202210030249. 1, issued Sep. 1, 2022.
Wang, Peng, et al., "Research Progress of Enhanced In Situ Bioremediation Technology for Groundwater Circulation Well," Safety and Environmental Engineering, vol. 28, No. 3, May 31, 2021, pp. 137-146.
(Continued)

*Primary Examiner* — Fred Prince
(74) *Attorney, Agent, or Firm* — Miles & Stockbridge PC; Ajay A. Jagtiani (57) ABSTRACT

The disclosure relates to a staggered electrode bio-electro-Fenton groundwater circulation well system, including a groundwater circulation well, a water pumping and injecting assembly and an in-well bio-electro-Fenton assembly. The water pumping and injecting assembly is configured to
(Continued)

realize water pumping and injection between different screening sections of the groundwater circulation well. The bio-electro-Fenton assembly arranged in a first screening section of the groundwater circulation well includes at least one electrode device. A cathode and an anode of the electrode device form a spatially staggered arrangement according to different distribution areas. According to the disclosure, the spatially staggered arrangement of the cathode and the anode, the influence of oxygen on an anaerobic environment of an anode chamber in the electrode device is greatly reduced while ensuring the cathode takes oxygen as an electron acceptor, and the constructed bio-electro-Fenton system can accelerate the decomposition of organic pollutants in the groundwater circulation well.

5 Claims, 5 Drawing Sheets

(52) U.S. Cl.
CPC . *C02F 2103/06* (2013.01); *C02F 2201/46115* (2013.01); *C02F 2203/006* (2013.01)

(58) Field of Classification Search
USPC ....... 210/616, 747.7, 170.07, 748.01, 748.17
See application file for complete search history.

(56) References Cited

FOREIGN PATENT DOCUMENTS

| | | | |
|---|---|---|---|
| CN | 102515343 | B | 6/2013 |
| CN | 105850864 | A | 8/2016 |
| CN | 206751603 | U | 12/2017 |
| CN | 206955867 | U | 2/2018 |
| CN | 108640255 | A | 10/2018 |
| CN | 208265922 | U | 12/2018 |
| CN | 109179860 | A | 1/2019 |
| CN | 210598814 | U | 5/2020 |
| CN | 112551681 | A | 12/2020 |
| CN | 112250164 | A | 1/2021 |
| CN | 113149150 | A | 7/2021 |
| CN | 114262046 | A | 4/2022 |
| WO | 2010042986 | A1 | 4/2010 |
| WO | WO-2019169398 | A1 * | 9/2019 .............. C02F 1/463 |
| WO | 2021160831 | A1 | 8/2021 |

OTHER PUBLICATIONS

Jia, Qiumeng, et al., "Applied Electrochemistry," Higher Education Press, Jul. 2004, pp. 245-246.
International Search Report and Written Opinion dated Dec. 26, 2022 in International Patent Application No. PCT/CN2022/120157.

* cited by examiner

STAGGERED ELECTRODE BIO-ELECTRO-FENTON GROUNDWATER CIRCULATION WELL SYSTEM, AND ELECTRO-FENTON ASSEMBLY

TECHNICAL FIELD

The present disclosure relates to the technical field of in-situ remediation of groundwater pollution, in particular to a staggered electrode bio-electro-Fenton groundwater circulation well system and an electro-Fenton assembly.

BACKGROUND

A groundwater circulation well technology is an in-situ remediation technology. Groundwater in an aquifer is driven to flow by the special design of a main well pipe in conjunction with the driving action of aeration and water pumping and injection, so that the groundwater forms a vertical three-dimensional water flow circulation in a certain spatial range of the aquifer around the groundwater circulation well. The technology is widely applied to remediation of groundwater polluted by organic compounds. The groundwater circulation well technology has the advantages of simple principle, low cost of pollution remediation, easy operation and maintenance of equipment and little disturbance to the aquifer, can be coupled with various pollution remediation technologies such as multi-phase extraction, in-situ aeration, microbial remediation and chemical oxidation, and has great development potential and broad application prospects in the field of organic pollutant-polluted groundwater remediation.

In the early groundwater circulation well technology, in-situ remediation of organic pollutant-polluted groundwater is realized mainly through in-well steam stripping and enhanced biological decomposition: 1. organic compounds in an aquifer are driven to enter the well through the continuous scouring disturbance action of three-dimensional water circulation, and in-well aeration blows off volatile and semi-volatile organic pollutants in groundwater from an aqueous phase to a gaseous phase; and 2. aeration increases the content of dissolved oxygen in the groundwater, and dissolved oxygen spreads to the affected area of the groundwater circulation well as the groundwater flows, so that the in-situ aerobic biological decomposition effect is enhanced. Therefore, the groundwater circulation well technology has a good remediation effect on groundwater pollution dominated by volatile organic compounds. The decomposition of non-volatile organic compounds depends on the existence of indigenous microorganisms, the decomposition performance of the pollutants and other factors. Organic pollutants, which are biologically decomposed difficultly, in groundwater need to be removed by coupling other pollution remediation technologies, and it is difficult for the single groundwater circulation well technology to achieve the ideal remediation effect.

A bio-electro-Fenton technology is a novel waste water treatment technology developed on the basis of a bioelectrochemical technology, which couples the bioelectrochemical technology and an electro-Fenton technology, and produces $H_2O_2$ in situ at a cathode to be bound with $Fe^{2+}$ to perform Fenton reaction to produce free radicals with strong oxidability, thereby efficiently oxidizing and decomposing organic pollutants. Due to the extracellular electron transfer action of anode electroactive microorganisms, the bio-electro-Fenton technology has the characteristic of low energy consumption, low cost, high pollutant decomposition efficiency, low selectivity or the like, which is very suitable for remediation of groundwater with various types of composite pollutions in actual sites.

At present, there is no report about combining the bio-electro-Fenton technology with the groundwater circulation well technology. Based on the characteristics of the two technologies, the two technologies are combined to be capable of realizing in-situ continuous efficient remediation of organic pollutant-polluted groundwater, but there are still many challenges, for example: the coupling form of a proton exchange membrane, an anaerobic environment required for the growth of electroactive microorganisms and the adding mode of an iron source. The present disclosure is committed to solving the above technical problems, and provides a groundwater circulation cell system applied to in-situ remediation of organic pollutant-polluted groundwater.

At present, there are few technical solutions for in-situ remediation of groundwater by the bio-electro-Fenton technology, and an injection remediation mode is widely used to remediate groundwater. For example, the patent document CN102515343B discloses an expansion type gas barrier device and a method of using same for injection remediation of groundwater pollution. The device includes a main gas injection pipe, wherein a middle part of the main gas injection pipe is sleeved with a rubber cylinder assembly made of an elastic material; and the upper part and the lower part of the rubber cylinder assembly are respectively sleeved with a group of rubber cylinder joint, protective sleeve, intermediate joint and connecting sleeve symmetrically by the main gas injection pipe. A connecting sleeve I is connected between an intermediate joint I and an upper joint. The upper joint is provided with an upper interface for connecting the main gas injection pipe with an external gas injection pipe. An inflating interface is arranged beside the upper interface. An upper end of the inflating interface is connected to an external inflating pipe, and a lower end of the inflating interface extends downwards to communicate with a gas injection cavity. According to the present disclosure, although ensuring rapid and one-way gas injection in an air injection well and satisfying the requirement of remediating groundwater at a volatile organic compound polluted site by a large-scale in-situ air injection technology, the device cannot implement vertical three-dimensional circulation of water, has poor applicability to the heterogeneous formation, and cannot purify organic pollutants coexisting in different phases synchronously. Different phases refer to: organic pollutants in a dissolved phase, a free phase, a gaseous phase and a residual phase.

For example, the patent document CN210598814U discloses a soil and groundwater sampling and remediation integrated drilling machine, including a power head part, wherein the power head part includes an impact rotary power head and a rotary spraying power head. The impact rotary power head and the rotary spraying power head are mounted in a sliding rail of a top dragging plate of a dragging plate part side by side, and the top dragging plate is connected to a bottom dragging plate through an oil cylinder. One end of the oil cylinder is fixed to the bottom dragging plate through a hinge pin and a split pin, and the other end of the oil cylinder locks the top dragging plate through an extended piston head by using a nut. The dragging plate part further includes a first wear-resistant plate and a second wear-resistant plate. The first wear-resistant plate and the second wear-resistant plate are fixed at upper and lower ends of the bottom dragging plate through bolts, and have a certain gap to form the sliding rail of the top dragging plate. The dragging plate part is mounted on a detection frame. However, this patent only can remediate groundwater, and cannot synchronously purify organic pollutants coexisting in different phases.

The patent document CN206955867U further discloses a groundwater circulation well device for in-situ remediation of organic pollutant-polluted groundwater, including a groundwater circulation well, an aeration system, a biological treatment system and a medicament feeding system. The groundwater circulation well is divided into an inner well and an outer well, and the inner well and the outer well are respectively divided into an upper section and a lower section which are separated by a partition board. The aeration system includes a gas pump, a gas conveying pipe and an aeration head. The biological treatment system includes a microbiological filler area, a submersible pump, a water pumping pipe and a spraying head. The medicament feeding system includes a remediation medicament storage container, a medicament adding pump, a medicament conveying pipe, a medicament feeding pipe and a medicament adding pipe. However, the device has a small loading space of microorganisms and high selectivity to pollutants, and is greatly affected by the biotoxicity of pollutants to result in low remediation efficiency.

The patent document CN112551681A further discloses a single-chamber type microbial electro-Fenton assembly and application thereof. The single-chamber type microbial electro-Fenton assembly includes: an anode, a cathode and electrolyte. The anode and the cathode are arranged in the same single chamber. The anode includes: an anode base material formed by rolling multiple layers of carbon cloth and plastic nets. The plastic nets are arranged between the carbon cloth and configured to separate the carbon cloth. Mixed bacteria are loaded on the anode base material. The mixed bacteria are composed of *Rhodopseudomonas palustris, Bacillus proteus vulgaris, Bacillus toyonensis* and *Alcanivorax pacificus*. The cathode includes: a bracket made of a titanium net. The bracket is filled with active carbon powder on which graphene and cobalt are loaded. The electrolyte includes to-be-treated sewage and added nutrient substances. The mixed bacteria decompose organic compounds in the to-be-treated sewage to produce electrons for the cathode to use. However, in this patent, the anode and the cathode are arranged in the sewage, so that $O_2$ near the cathode greatly affects the reaction activity of the microorganisms loaded on the surface of the anode.

In addition, on one hand, there are differences are present in the understanding of those skilled in the art, and on the other hand, the applicant has studied a large number of documents and patents when making the present disclosure, and not all the details and contents are listed in detail due to the limited space. However, it by no means indicates that the present disclosure does not have the features of the prior art, and on the contrary, the present disclosure already has all features of the prior art. Furthermore, the applicant reserves the right to add relevant prior art to the background.

SUMMARY

A groundwater circulation well used for in-situ remediation of groundwater in the prior art purifies groundwater mainly through two modes: in-well aeration and enhanced in-situ biological decomposition. Due to high pollutant selectivity and limited capability of remediating pollutions, the groundwater circulation well can enhance its remediation ability for the polluted groundwater by only coupling with other technologies. According to a bio-electro-Fenton technology, $H_2O_2$ is produced on a surface of a cathode and performs Fenton reaction with $Fe^{2+}$, so that organic pollutants in water can be efficiently decomposed, and low selectivity and low energy consumption are achieved. Coupling the two technologies may realize in-situ efficient continuous remediation of organic pollutant-polluted groundwater. According to the present disclosure, a unique electrode structure is provided in a groundwater circulation well, so that a cathode and an anode are spatially staggered. For example, the cathode and the anode are staggered in a vertical direction, or the cathode and the anode are staggered inside and outside an anode chamber, thereby reducing the influence of oxygen on an anaerobic environment of the anode while providing oxygen to the cathode. According to the present disclosure, the influence of oxygen on an anaerobic environment of the anode is reduced by changing the position of an aeration head of an aeration system, wherein the aeration head is arranged at the junction of the cathode and the anode, and the aeration head faces the cathode. According to the present disclosure, anode liquid composed of organic waste water is injected into the anode chamber, so that electroactive microorganisms of the anode can decompose the organic waste water at the same time, thereby achieving synchronous purification of the organic waste water and organic pollutants in groundwater.

For the shortcomings of the prior art, the present disclosure provides a staggered electrode bio-electro-Fenton groundwater circulation well system, at least including a groundwater circulation well, a water pumping and injecting assembly and a bio-electro-Fenton assembly. The water pumping and injecting assembly is configured to realize water pumping and injection between different screening sections of the groundwater circulation well. The bio-electro-Fenton assembly arranged in a first screening section of the groundwater circulation well at least includes a plurality of staggered electrode devices, wherein a plurality of cathodes and a plurality of anodes of the electrode devices are spatially staggered according to different distribution areas, and/or the cathodes of the electrode devices are arranged outside a chamber coated with a proton exchange membrane, the anodes are arranged inside the chamber coated with the proton exchange membrane, and the cathodes and the anodes are staggered in an axial direction of the electrode devices.

According to the present disclosure, the cathodes and the anodes are spatially staggered, so that a cathode distribution area and an anode distribution area are separated, thereby facilitating targeted aeration in different areas and reducing the influence of oxygen on the anaerobic environment of the anode.

In the prior art, electrode devices are distributed in groundwater. Since there are no areas divided for the distribution of cathodes and oxygen, the anodes will be affected by the aerated oxygen when the cathodes are aerated, which may reduce the decomposition efficiency of the anodes on organic compounds. For this shortcoming, at least one chamber coated by a proton exchange membrane is arranged in an electrode device according to the present disclosure to form an anode chamber for injecting anode liquid therein. A first part, belonging to an anode section, of the anode chamber is filled with conductive carrier particles of electroactive microorganisms to form an anode, and outer surface of a second part, belonging to a cathode section, of the anode chamber is coated with an iron-modified carbon felt electrode to form a cathode, so that the anode and the cathode are staggered inside and outside the anode chamber. According to the present disclosure, the cathode and the anode are staggered inside and outside the anode chamber, so that the anode is away from the cathode. When the cathode receives oxygen, the electroactive microorganisms in the anode are in an oxygen-free environment in the anode chamber and are not in direct contact with oxygen. Meanwhile, the electroactive microorganisms can decompose organic pollutants in the anode liquid, thereby achieving the technical effect of purifying the anode liquid and cathode liquid at the same time. According to the present disclosure, the anode with the conductive carrier particles has a large surface area, which allows a greater loading space for the electroactive microorganisms. The cathode formed by the iron-modified carbon felt electrode greatly reduces the risk of secondary pollution of groundwater caused by Fenton-like reaction and $Fe^{2+}$.

According to the present disclosure, the anode and the cathode of the electrode device are arranged and distributed in staggered areas, that is, the cathode distribution area and the anode distribution area only have a junction and do not have an intersection. Therefore, according to the present disclosure, aeration can be performed specific to the cathode distribution area, thereby reducing the influence of aeration on the electroactive microorganisms of the anode. Preferably, the groundwater circulation well system further includes an aeration system, wherein an aeration head of the aeration system is arranged at a junction of the anode and the cathode, and the aeration head is arranged to perform aeration towards a position where the cathode is located, so that the influence of oxygen on an anaerobic environment of the anode chamber is reduced.

For the shortcoming in the prior art that only groundwater can be remediated, the groundwater circulation well system can decompose the anode after deoxidizing the anode liquid. Specifically, the anode liquid is organic waste water deoxidized by a deoxidation system, so that the electroactive microorganisms loaded on the surfaces of the conductive carrier particles filled in the anode section in the anode chamber grow in the anaerobic environment. After the anode liquid is deoxidized, the electroactive microorganisms loaded on the surfaces of the conductive carrier particles may have the higher decomposition ability, so that organic waste water, i.e., the anode liquid, discharged by a multi-phase extraction unit or other production process can be decomposed, thereby purifying surface organic waste water and groundwater at the same time. Preferably, when electrified, the electroactive microorganisms loaded on the surfaces of the conductive carrier particles in the anode are configured to decompose an organic carbon source in the anode liquid to produce protons and electrons. The cathode is configured to take oxygen as an electron acceptor to be bound with protons transferred from the anode to produce $H_2O_2$, and take $Fe^{3+}$ as an electron acceptor to produce $Fe^{2+}$, so that a Fenton-like reaction occurs on a surface of the cathode and organic pollutants in the cathode liquid are decomposed, thereby purifying the anode liquid injected into the chamber in the electrode device and the cathode liquid in the groundwater circulation well at the same time, wherein the anode liquid is organic waste water, and the cathode liquid is organic pollutant-polluted groundwater.

Preferably, a plurality of electrode devices are provided and arranged in parallel, and a horizontal position of a center of the cathode is higher than a horizontal position of a center of the anode. The electrode devices are provided and arranged in parallel, which is advantageous to distributing cathodes and anodes in different areas. The cathode is arranged at a higher position, and the anode is arranged at a lower position. The anode liquid is injected by an injection pump into a position where the anode at the bottom of the chamber is located, flows in the chamber from bottom to top, and is extracted at a position where the cathode at the top of the chamber is located, thereby lowering the extraction difficulty of an extraction pump and reducing the energy consumption of the extraction pump. Meanwhile, the anode liquid flows from bottom to top, which is advantageous to transferring protons produced by anode reaction to the cathode through the proton exchange membrane, thereby reducing the mass transfer resistance.

Preferably, a plurality of electrode devices are provided and arranged vertically in parallel, and the cathode is located at the top end of the anode. The electrode devices are provided and arranged vertically, and the cathode is higher than the anode, which may be advantageous to shortening the path of the anode liquid flowing into the anode chamber. During aeration, bubbles move upwards, and the cathode at a higher position is advantageous to rapid reception of oxygen by the cathode, and also advantageous to reduction of the possibility of the anode in contact with oxygen.

Preferably, the anode liquid is injected from an anode end of the electrode device to the anode chamber, and the anode liquid after reaction is extracted from a cathode end of the electrode device. Due to the injection and extraction of the anode liquid, the purified anode liquid can be rapidly discharged, and new anode liquid is injected, so that the anode liquid can be subjected to continuous reaction and decomposition.

Preferably, the anode chamber in the electrode device is composed of a pipe of which an outer surface is coated with a proton exchange membrane, wherein a pipe wall of the pipe is provided with a plurality of holes penetrating the pipe wall, thereby providing effective channels for the protons of the anode chamber to be transferred to the cathode through the proton exchange membrane, and reducing the mass transfer resistance.

The present disclosure further provides a staggered electrode bio-electro-Fenton groundwater circulation well system, at least including a groundwater circulation well, a water pumping and injecting assembly and an in-well bio-electro-Fenton assembly. The water pumping and injecting assembly is configured to realize water pumping and injection between different screening sections of the groundwater circulation well. The bio-electro-Fenton assembly arranged in a first screening section of the groundwater circulation well includes at least one electrode device. A cathode and an anode of the electrode device form a spatially staggered arrangement according to different distribution areas.

Preferably, at least one chamber coated with a proton exchange membrane is arranged in the electrode device to form an anode chamber for injecting anode liquid therein. The cathode of the electrode device is arranged outside the chamber coated with the proton exchange membrane. The anode is arranged inside the chamber coated with the proton exchange membrane. The cathode and the anode are staggered in an axial direction of the electrode device.

Preferably, an anode section of the anode chamber is filled with conductive carrier particles to form the anode, and a cathode section of the anode chamber is not filled with conductive carrier particles.

Preferably, an outer surface of the cathode section is coated with an iron-modified carbon felt electrode to form the cathode, and the anode and the cathode are staggered inside and outside the anode chamber.

Preferably, electroactive microorganisms are loaded on surfaces of the conductive carrier particles. The anode liquid is deoxidized organic waste water. The electroactive microorganisms are arranged to grow in an anaerobic environment composed of the anode liquid when the anode liquid has been injected into the anode chamber.

Preferably, when electrified, the electroactive microorganisms are configured to decompose an organic carbon source in the anode liquid to produce protons and electrons. The cathode is configured to take oxygen as an electron acceptor to be bound with protons transferred from the anode to produce $H_2O_2$, and take $Fe^{3+}$ as an electron acceptor to produce $Fe^{2+}$, so that a Fenton-like reaction occurs on a surface of the cathode and organic pollutants in the cathode liquid are decomposed, thereby purifying the anode liquid injected into the chamber in the electrode device and the cathode liquid in the groundwater circulation well at the same time.

Preferably, at least two electrode devices are provided and arranged in parallel.

Preferably, the electrode device can be arranged in the cathode liquid in any posture under the condition that a horizontal position of a center of the cathode is higher than a horizontal position of a center of the anode.

Preferably, the anode liquid is deoxidized by a deoxidation system before the anode liquid is injected into the anode chamber.

Preferably, the groundwater circulation well system further includes an aeration system. An aeration head of the aeration system is arranged at a junction of the anode and the cathode, and the aeration head is arranged to perform aeration towards a position where the cathode is located, so that the influence of oxygen on an anaerobic environment of the anode chamber is reduced.

Preferably, an outer surface of a pipe is coated with the proton exchange membrane; and a pipe wall of the pipe is provided with a plurality of holes penetrating the pipe wall so as to allow protons to pass through the proton exchange membrane.

The present disclosure further provides a bio-electro-Fenton assembly for purifying anode liquid and cathode liquid simultaneously, including at least one electrode device. At least one chamber coated with a proton exchange membrane is arranged in the electrode device to form an anode chamber for injecting anode liquid therein. A first part, belonging to an anode section, of the anode chamber is filled with conductive carrier particles to form an anode. An outer surface of a second part, belonging to a cathode section, of the anode chamber is coated with an iron-modified carbon felt electrode to form a cathode. A plurality of cathodes and a plurality of anodes of the electrode device are spatially staggered according to different distribution areas.

Preferably, an outer surface of a pipe is coated with the proton exchange membrane; and a pipe wall of the pipe is provided with a plurality of holes penetrating the pipe wall so as to allow protons to pass through the proton exchange membrane.

Preferably, electroactive microorganisms are loaded on surfaces of the conductive carrier particles, and the anode liquid is deoxidized organic waste water. The electroactive microorganisms are arranged to grow in an anaerobic environment composed of the anode liquid when the anode liquid has been injected into the anode chamber.

Preferably, the bio-electro-Fenton assembly further includes an aeration system. An aeration head of the aeration system is arranged at a junction of the anode and the cathode, and the aeration head is arranged to perform aeration towards a position where the cathode is located, so that the influence of oxygen on an anaerobic environment of the anode chamber is reduced.

According to the bio-electro-Fenton assembly according to the present disclosure, the cathode distribution area and the anode distribution area can be separated by spatially staggering the cathode and the anode, and the aeration system is provided to blow only towards the cathode, so that the influence of oxygen on the anaerobic environment of the anode can be reduced, and the decomposition ability of the electroactive microorganisms in the anode can be improved.

LIST OF REFERENCE NUMERALS

100: groundwater circulation well; 1: well body; 2: first screening hole; 3: second screening hole; 4: packer; 5: water pumping and injecting assembly; 6: anode chamber; 7: cathode chamber; 8: proton exchange membrane; 9: aeration system; 10: power supply; 11: anode; 12: cathode; 13: pipe; 14: aeration head; 15: liquid storage tank; 16: first pump; 17: second pump; 18: deoxidation system; 19: vacuum pump; 20: gas treatment device; 21: first screening section; 22: second screening section; 23: electroactive microorganism.

DETAILED DESCRIPTION

The present disclosure is described in detail with reference to the accompanying drawings.

For the shortcomings of the prior art, the present disclosure provides a staggered electrode bio-electro-Fenton groundwater circulation well system, and further provides a bio-electro-Fenton assembly for a groundwater circulation well.

In the present disclosure, conductive carrier particles refer to particles capable of conducting electricity and loaded with microorganisms, for example, three-dimensional graphite particles.

In the present disclosure, electroactive microorganisms belong to a strain capable of decomposing an organic carbon source in organic waste water to produce protons and electrons, for example, cultured and domesticated *Shewanella oneidensis* and Geobacteraceae.

A well body 1 of a groundwater circulation well is divided by a packer 4 into at least two parts, namely, a first screening section 21 and a second screening section 22. A position of the first screening section 21 is higher than a position of the second screening section 22. A well wall of the first screening section 21 is provided with first screening holes 2. A well wall of the second screening section 22 is provided with second screening holes 3. Groundwater in the aquifer enters the second screening section 22 through the second screening holes 3 under the action of gravity. A water pumping and injecting assembly 5 is configured to realize water pumping and injection between different screening sections of the groundwater circulation well, and for example, includes a main pump, a second pipeline penetrating through the packer 4 and extending to the second screening section 22, and a first pipeline extending into the first screening section 21. The water pumping and injecting assembly 5 pumps groundwater in the second screening section 22 and injects the groundwater into the first screening section 21. The groundwater in the first screening section 21 flows out from the first screening holes 2 to the groundwater aquifer outside the well to form a vertical three-dimensional groundwater flow circulation.

Figure 1:
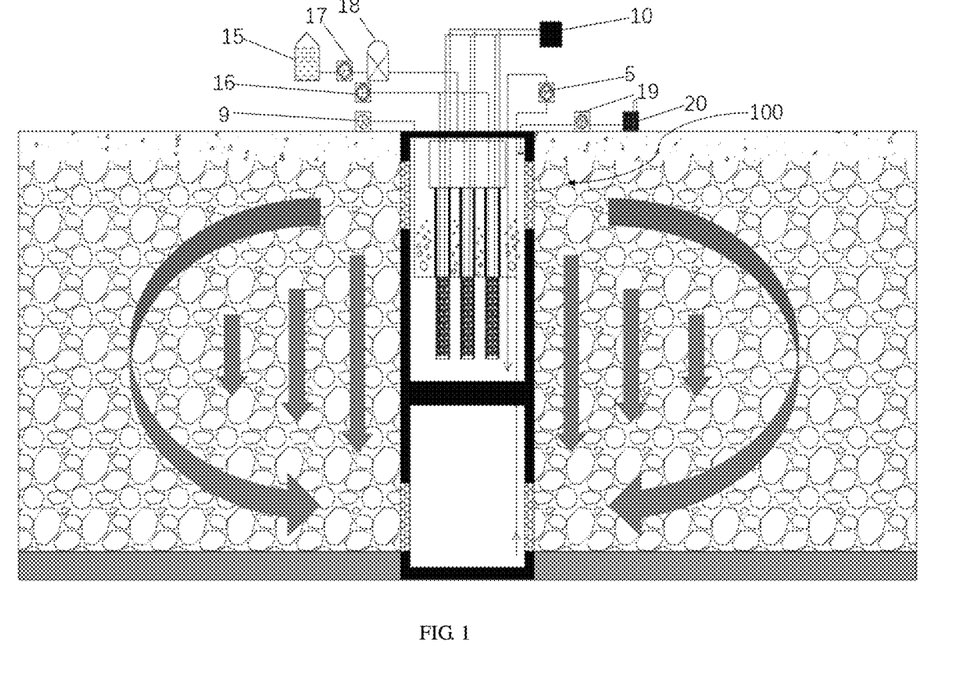
FIG. 1 is a simplified schematic diagram of a groundwater circulation well system in a working state according to a preferred embodiment of the present disclosure.
Figure 2:
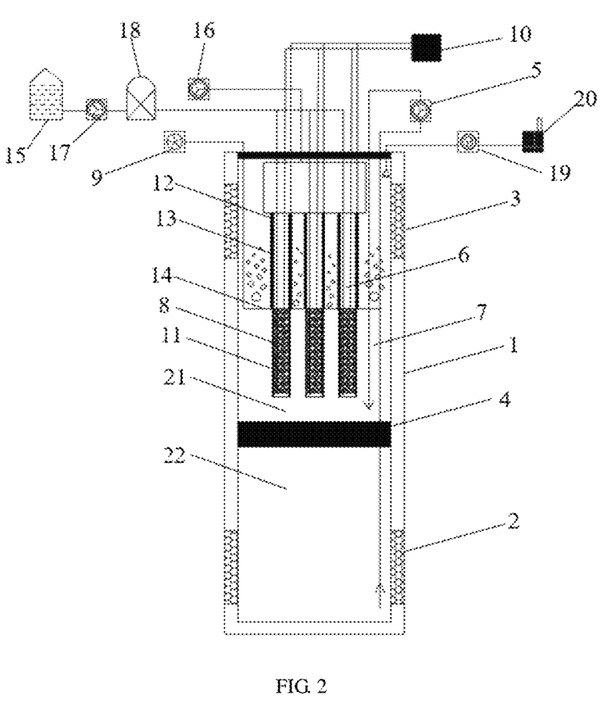
FIG. 2 is a simplified schematic diagram of a groundwater circulation well system according to a preferred embodiment of the present disclosure.

As shown in FIG. 1 and FIG. 2, the bio-electro-Fenton assembly of the present disclosure is arranged in the first screening section 21 of the groundwater circulation well 100. There may be one set of bio-electro-Fenton assembly, or a plurality of sets of bio-electro-Fenton assemblies. The bio-electro-Fenton assembly can be set based on the size of the groundwater circulation well. A plurality of bio-electro-Fenton assemblies may be arranged in parallel.

The bio-electro-Fenton assembly at least includes a plurality of staggered electrode devices. Anodes 11 and cathodes 12 are respectively connected to positive and negative electrodes of an additional direct current power supply 10 by wires.

Figure 3:
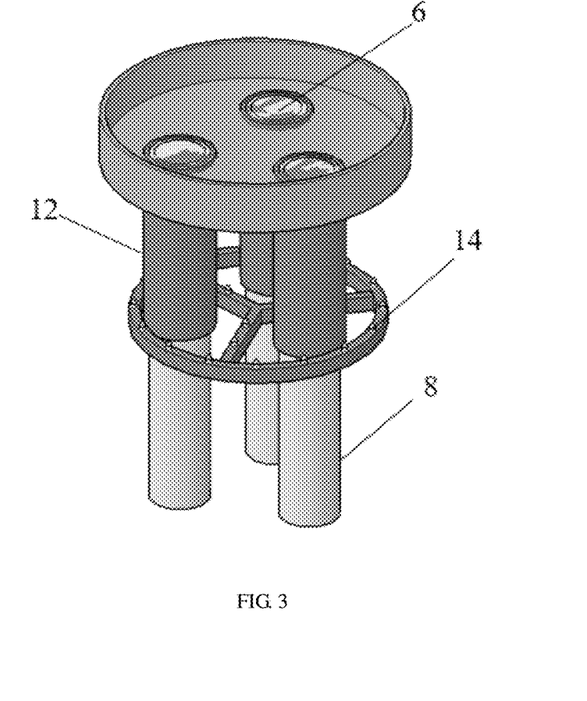
FIG. 3 is a simplified schematic diagram of a bio-electro-Fenton assembly according to the present disclosure.

Spatial distribution areas of the cathode 12 and the anode 11 of the electrode device are staggered, so that the cathode 12 and the anode 11 are spatially staggered. As shown in FIG. 1 to FIG. 3, the electrode device includes an anode 11 and a cathode 12. The anode 11 and the cathode 12 have a junction. Cathodes 12 of a plurality of electrode devices are arranged in the same direction, and anodes 11 of a plurality of electrode devices are arranged in the same direction, so that the anodes 11 and the cathodes 12 are distributed according to two areas. The anodes 11 and the cathodes 12 are staggered to form staggered distribution.

Preferably, the cathode 12 of the electrode device is arranged outside a chamber coated with a proton exchange membrane 8, the anode 11 is arranged inside the chamber coated with the proton exchange membrane, and the cathode 12 and the anode 11 are staggered in an axial direction of the electrode device, so that the cathode 12 and the anode 11 are spatially staggered. For example, the anode 11 is arranged inside the chamber, and the cathode 12 is arranged on a surface of the proton exchange membrane on the exterior of the chamber. Due to the staggered distribution areas and the staggered setting positions of the anode 11 and the cathode 12, the anode 11 and the cathode 12 are spatially staggered.

The cathode 12 and the anode 11 require different reaction environments, the cathode 12 requires oxygen, and the anode 11 requires an anaerobic environment to decompose organic compounds. When the anode 11 and the cathode 12 are spatially staggered, different distribution areas make the reaction of the anode 11 less affected by oxygen in an environment where the cathode 12 is located, which is advantageous to performing different decomposition reactions by the cathode and the anode respectively.

The electrode device of the present disclosure includes at least one chamber. The chamber is formed by coating a surface of a pipe 13 with a proton exchange membrane 8. The quantity of the chamber is not limited, which may be one or two or more. The shape of the chamber is not limited, which may be a sphere, a cylinder, a prism, a polygonal column, a special shape or an irregular shape, etc. Preferably, the chamber is set to be cylindrical. Preferably, the pipe 13 may be a stainless steel pipe, or a resin pipe, or a pipe formed by other materials.

Figure 4:
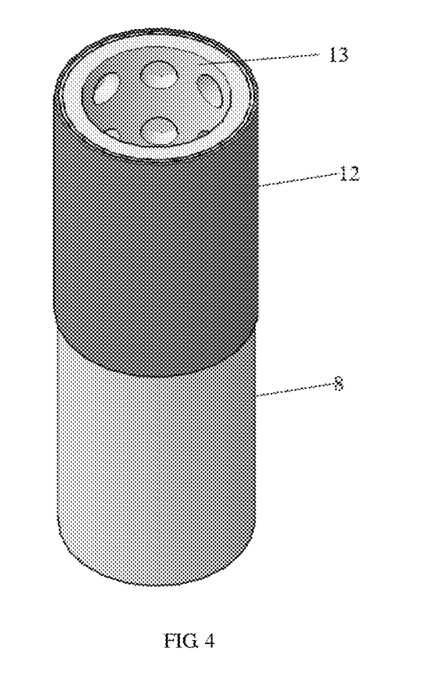
FIG. 4 is a simplified schematic diagram of an anode chamber of an electrode device according to the present disclosure.
Figure 5:
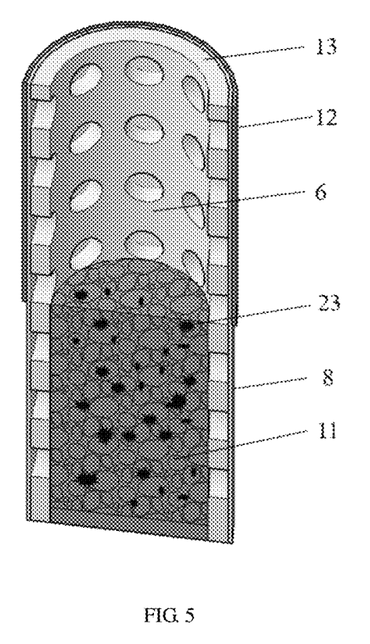
FIG. 5 is a section view of an electrode device according to the present disclosure.

As shown in FIG. 4 and FIG. 5, a pipe wall of the pipe 13 is provided with a plurality of holes penetrating the pipe wall. The holes may be distributed according to a regular arrangement manner, or according to an irregular arrangement manner. The holes are provided for protons to pass through the proton exchange membrane. The shape of each hole is not limited, which may be a square, a circle, a triangle, a polygon or an irregular shape. The proton exchange membrane 8 seals the holes and end parts of the pipe 13, that is, seals the whole pipe 13.

The chamber formed by the pipe 13 of which an outer surface is coated with the proton exchange membrane 8 is called an anode chamber 6. An environment, where the chamber is located, in the first screening section 21 is called a cathode chamber 7. Organic pollutant-polluted groundwater continuously flowing in the cathode chamber 7 is cathode liquid.

As shown in FIG. 4 and FIG. 5, on end of the anode chamber 6 is filled with conductive carrier particles on which electroactive microorganisms 23 are loaded to form an anode 11. The anode 11 formed by the conductive carrier particles has a great surface area, which allows a greater loading space for the electroactive microorganisms 23. The cathode formed by iron-modified carbon felt greatly reduces the risk of secondary pollution of groundwater caused by Fenton-like reaction and $Fe^{2+}$.

A first part, filled with the conductive carrier particles, of the anode chamber 6 forms an anode section, and a second part not filled with the conductive carrier particles forms a cathode section. An electrode section, filled with the conductive carrier particles, of the anode chamber is configured to inject anode liquid therein. The anode liquid is organic waste water. The organic waste water may be multi-phase extraction separation medium, or may be discharged by other processes of a factory. The anode liquid permeates into the conductive carrier particles to be in contact with the electroactive microorganisms. The anode liquid is injected into the anode chamber from an anode end of the electrode device, and the anode liquid subjected to reaction is extracted from a cathode end of the electrode device.

An outer surface of the proton exchange membrane 8 of the cathode section is coated with an iron-modified carbon felt electrode to form a cathode 12. The iron-modified carbon felt electrode is a carbon felt electrode on which $Fe^{3+}$ is loaded. $Fe^{3+}$ fixed on the surface of the carbon felt gains electrons to produce $Fe^{2+}$ which participates in Fenton reaction to form $Fe^{3+}$ again, and so on. In this way, the anode 11 and the cathode 12 are staggered inside and outside the anode chamber 6.

Preferably, the anode with the conductive carrier particles and the cathode with iron-modified carbon felt are closely attached to the pipe 13 coated with the proton exchange membrane 8, thereby greatly shortening the distance between the electrode devices and reducing the mass transfer resistance.

As shown in FIG. 3, preferably, in the present disclosure, an aeration head 14 of an aeration system 9 is arranged at the junction of the anode 11 and the cathode 12. The aeration head 14 is arranged to perform aeration towards a position where the cathode 12 is located, so that the influence of oxygen on an anaerobic environment of the anode chamber is reduced while providing oxygen to the cathode.

After electrified, the electroactive microorganisms 23 loaded on the surfaces of the conductive carrier particles in the anode 11 decompose the organic carbon source in the anode liquid to produce protons and electrons when organic pollutants in groundwater are decomposed. Protons pass through the proton exchange membrane 8 through small holes in the pipe 13 to be transferred to the cathode chamber 7, and electrons are transferred to the cathode 12 through an external circuit.

The cathode 12 needs to take $O_2$ as an electron acceptor to be bound with protons transferred from the anode to produce $H_2O_2$. Fenton reaction occurs to $H_2O_2$ produced by the cathode and $Fe^{2+}$ produced by electrons of $Fe^{3+}$ loaded on the surface of the electrode device, thereby decomposing the organic pollutants in groundwater efficiently and continuously.

Therefore, under the a spatially staggered arrangement of the cathode and the anode, the aeration head blows towards the cathode, thereby greatly reducing the influence of oxygen on an anaerobic environment in the anode chamber while ensuring that the cathode takes oxygen as the electron acceptor. Volatile and semi-volatile organic pollutants in the organic pollutant-polluted groundwater can be blown off in the aeration process.

Preferably, the cathode end of the anode chamber 6 is connected to a liquid storage tank 15 which stores organic waste water. At least one second pump 17 is arranged on a pipeline between the anode chamber 6 and the liquid storage chamber 15, and is configured to convey anode liquid from the liquid storage tank 15 to a deoxidation system 18. A first pump 16 conveys the deoxidized organic waste water into the anode chamber 6. In the present disclosure, the first pump 16 and the second pump 17 may be pumps capable of extracting fluid, for example, water pumps.

The anode liquid is organic waste water deoxidized by the deoxidation system 18, so that the electroactive microorganisms 23 loaded on the surfaces of the conductive carrier particles filled in the anode section in the anode chamber 6 are arranged to grow in the anaerobic environment.

After operation of the bio-electro-Fenton system provided by the present disclosure, the anode liquid and the cathode liquid can be decomposed and purified at the same time based on the unique structure of the electrode device, that is, the organic waste water and the polluted groundwater are decomposed and purified at the same time, thereby realizing synchronous purification. The present disclosure combines the groundwater circulation cell technology with the bio-electro-Fenton technology, thereby realizing in-situ continuous efficient remediation of organic pollutant-polluted groundwater.

Preferably, a plurality of electrode devices are provided and arranged in parallel, and a horizontal position of a center of the cathode 12 is higher than a horizontal position of a center of the anode 11. For example, in the case that the electrode device inclines relative to the axis of the groundwater circulation well, the cathode 12 is higher than the anode 11. Since oxygen of the aeration head moves upwards in the cathode liquid, the cathode 12 at a higher position can sufficiently receive oxygen, and the influence of oxygen on the anode can be reduced.

Preferably, as shown in FIG. 3, a plurality of electrode devices are provided and arranged vertically in parallel, and the cathode 12 is located at the top end of the anode 11 in a vertical direction. The electrode device is arranged vertically, so that the contact area of oxygen of the aeration head and the cathode 12 is increased, thereby improving the decomposition efficiency of the cathode.

Preferably, the structure of the electrode device of the present disclosure is not limited to the exemplary structure provided by the present disclosure. The chamber in the electrode device of the present disclosure may also include other structures, for example, the cathode and the anode may not be directly adjacent to each other, and other structures which do not affect the operation of the cathode and the anode in electrification can be arranged between the cathode and the anode. For example, the chamber in the electrode device cannot extend to the cathode end or the anode end, and may be shorter than the current example.

For example, when gas of the aeration head can be guided by a certain structure to move to the cathode and meanwhile, the conductive carrier particles of the anode can be limited by a net-like structure to a filling position, the electrode device can be arranged transversely or obliquely in a horizontal direction to perform enhanced purification on organic waste water and groundwater.

Preferably, at the anode section of the chamber, the chamber is not limited to a columnar chamber in structure, and can also be isolated into a plurality of sub-chambers that allow anode liquid to flow through. The chamber can be isolated into a plurality of sub-chambers along a radial direction of the pipe, or can also be isolated into a plurality of sub-chambers along an axial direction of the pipe, or can be isolated into a plurality of other regular or irregular sub-chambers. The plurality of sub-chambers are filled with conductive carrier particles. The conductive carrier particles can fill all the sub-chambers, or can fill part of the sub-chambers.

There may be a gap or no gap between the sub-chambers. Preferably, when a gap is formed between the sub-chambers, it is beneficial to increase the contact area of the anode liquid and the electroactive microorganisms 23 on the surfaces of the conductive carrier particles, and is also beneficial to reduce the extraction resistance of the anode liquid, so that the anode liquid can be extracted more easily.

Preferably, the chamber also can only be present in the anode of the electrode device. The anode liquid is injected from one end of the anode and is extracted from the other end of the anode.

Preferably, holes in the pipe wall of the pipe 13 may also be only distributed at the anode section.

Preferably, the present disclosure further includes a vacuum pump 19 and a gas treatment device 20. The vacuum pump 19 is connected to the gas treatment device 20 through a pipeline. The pipeline connected to the vacuum pump 19 extends into the first screening section 21. Preferably, the pipeline connected to the vacuum pump 19 extends to a wellhead in the first screening section 21 to extract gas such as carbon dioxide after oxidation and decomposition of volatile and semi-volatile organic pollutants blown off by aeration and organic compounds in groundwater and feed the gas such as carbon dioxide to the gas treatment device 20. The gas treatment device 20 discharges the gas, which reaches the standard after treatment, to the atmosphere.

It should be noted that the above specific embodiments are exemplary, and those skilled in the art may conceive various solutions under the enlightenment of the content disclosed in the present disclosure. These solutions also fall within the disclosed scope of the present disclosure and the protection scope of the present disclosure. It should be understood by those skilled in the art that the description and the drawings of the present disclosure are illustrative and do not constitute a limitation on the claims. The protection scope of the present disclosure is defined by the claims and equivalents thereof. The description of the present disclosure includes many inventive concepts, for example, "preferably", "according to one preferred embodiment" or "optionally" indicates that the corresponding paragraph discloses an independent concept, and the applicant reserves the right to file a divisional application according to each inventive concept.

What is claimed is:

1. A staggered electrode bio-electro-Fenton groundwater circulation well system, at least comprising a groundwater circulation well, a water pumping and injecting assembly and an in-well bio-electro-Fenton assembly, wherein the water pumping and injecting assembly is configured to realize water pumping and injection between different screening sections of the groundwater circulation well;
the bio-electro-Fenton assembly arranged in a first screening section (21) of the groundwater circulation well comprises at least a plurality of staggered electrode devices; and
a cathode (12) and an anode (11) of each electrode device form a spatially staggered arrangement according to different distribution areas;
the cathode (12) of each electrode device is arranged outside thea chamber coated with a proton exchange membrane (8);
the anode (11) is arranged inside the chamber coated with the proton exchange membrane (8); and
the cathode (12) is arranged on top of the anode (11); and
the cathode (12) and the anode (11) are staggered in an axial direction of each electrode device;
at least one chamber coated with the proton exchange membrane (8) is arranged in each electrode device to form an anode chamber (6) for injecting anode liquid therein;
a first part, belonging to an anode section, of the anode chamber (6) is filled with conductive carrier particles loaded with electroactive microorganisms to form the anode (11);
an outer surface of a second part, belonging to a cathode section, of the anode chamber (6) is coated with an iron-modified carbon felt electrode to form the cathode (12);
such that the anode (11) and the cathode (12) are staggered inside and outside the anode chamber (6);
the anode liquid is organic waste water that has been deoxidized by a deoxidation system, so that the electroactive microorganisms (23) loaded on surfaces of the conductive carrier particles filled at the anode section inside the anode chamber (6) are arranged to grow in an anaerobic environment;
when electrified, the electroactive microorganisms (23) loaded on surfaces of the conductive carrier particles in the anode (11) are configured to decompose an organic carbon source in the anode liquid to produce protons and electrons; and
the cathode (12) is configured to take oxygen as an electron acceptor to be bound with protons transferred from the anode to produce $H_2O_2$, and take $Fe^{3+}$ as an electron acceptor to produce $Fe^{2+}$, so that a Fenton-like reaction occurs on a surface of the cathode and organic pollutants in the cathode liquid are decomposed, thereby purifying the anode liquid injected into the chamber in the electrode device and the cathode liquid in the groundwater circulation well at a same time;
wherein the anode liquid is organic waste water, and the cathode liquid is organic pollutant-polluted groundwater;
the chamber is formed of a pipe (13) coated with the proton exchange membrane (8), a pipe wall of the pipe (13) is provided with a plurality of holes penetrating the pipe wall;
the groundwater circulation well system further comprises an aeration system, wherein an aeration head (14) of the aeration system is arranged at a junction of the anode (11) and the cathode (12), and the aeration head (14) is arranged to perform aeration towards a position where the cathode (12) is located, so that the influence of oxygen on the anaerobic environment of the anode chamber is reduced.

2. The staggered electrode bio-electro-Fenton groundwater circulation well system according to claim 1, wherein the plurality of electrode devices are provided and arranged in parallel; an electrode group formed by the plurality of electrode devices arranged in parallel is capable of being arranged in the cathode liquid in any posture.

3. The staggered electrode bio-electro-Fenton groundwater circulation well system according to claim 1, wherein the plurality of electrode devices are provided and arranged vertically in parallel, and the cathode (12) is located at the top end of the anode (11).

4. The staggered electrode bio-electro-Fenton groundwater circulation well system according to claim 1, wherein the anode chamber (6) in each electrode device is formed of a pipe (13) coated with the proton exchange membrane (8), a pipe wall of the pipe (13) is provided with a plurality of holes penetrating the pipe wall.

5. A bio-electro-Fenton assembly for purifying anode liquid and cathode liquid simultaneously, applied in the staggered electrode bio-electro-Fenton groundwater circulation well system according to claim 1, wherein the bio-electro-Fenton assembly comprises at least a plurality of staggered electrode devices,
at least one chamber coated with the proton exchange membrane (8) is arranged in each electrode device to form an anode chamber (6) for injecting anode liquid therein;
a first part, belonging to an anode section, of the anode chamber (6) is filled with conductive carrier particles loaded with electroactive microorganisms to form an anode (11);
an outer surface of a second part, belonging to a cathode section, of the anode chamber (6) is coated with an iron-modified carbon felt electrode to form a cathode (12);
such that the anode (11) and the cathode (12) are staggered inside and outside the anode chamber (6), and
the spatial distribution areas of the cathode (12) and the anode (11) of each electrode device form a staggered arrangement.

* * * * *